US012592584B2

(12) United States Patent
Kato et al.

(10) Patent No.: US 12,592,584 B2
(45) Date of Patent: *Mar. 31, 2026

(54) POWER SYSTEM SUPERVISORY CONTROL APPARATUS, SYSTEM, AND METHOD USING SUPPLY RELIABILITY

(71) Applicant: HITACHI, LTD., Tokyo (JP)

(72) Inventors: Daichi Kato, Tokyo (JP); Masahiro Watanabe, Tokyo (JP); Takahisa Matsuzaki, Tokyo (JP); Yohei Murakami, Tokyo (JP)

(73) Assignee: HITACHI, LTD., Tokyo (JP)

( * ) Notice: Subject to any disclaimer, the term of this patent is extended or adjusted under 35 U.S.C. 154(b) by 341 days.

This patent is subject to a terminal disclaimer.

(21) Appl. No.: 18/253,876

(22) PCT Filed: Oct. 25, 2021

(86) PCT No.: PCT/JP2021/039328
§ 371 (c)(1),
(2) Date: May 22, 2023

(87) PCT Pub. No.: WO2022/130790
PCT Pub. Date: Jun. 23, 2022

(65) Prior Publication Data
US 2024/0113558 A1      Apr. 4, 2024

(30) Foreign Application Priority Data
Dec. 15, 2020    (JP) ................................. 2020-207325

(51) Int. Cl.
*H02J 13/333*        (2026.01)
*H02J 3/00*          (2026.01)
(Continued)

(52) U.S. Cl.
CPC ............ *H02J 13/333* (2026.01); *H02J 3/001* (2020.01); *H02J 3/004* (2020.01); *H02J 13/12* (2026.01);
(Continued)

(58) Field of Classification Search
CPC ............... H02J 2203/20; H02J 2210/52; H02J 2210/60; H02J 2300/20
(Continued)

(56) References Cited

U.S. PATENT DOCUMENTS

2010/0231050 A1*   9/2010   Tamaki ................... H02J 1/102
307/76
2016/0099567 A1*   4/2016   Sun ......................... H02J 3/144
700/296
(Continued)

FOREIGN PATENT DOCUMENTS

JP         2019-030065 A      2/2019

OTHER PUBLICATIONS

International Search Report, mailed Dec. 14, 2021, for International Application No. PCT/JP2021/039328.

*Primary Examiner* — Md Azad
(74) *Attorney, Agent, or Firm* — Baker Botts L.L.P.

(57)        ABSTRACT
A power system supervisory control apparatus, a power system supervisory control system, and a power system supervisory control method for reducing social cost and improving resilience of a power system are provided. The power system supervisory control apparatus including multiple renewable energy power supplies includes: a system influence degree evaluation section that evaluates a system influence degree when a renewable energy fluctuation or an assumed fault has an influence on the power system by using, as computation conditions, system data for obtaining a state of the power system, renewable energy fluctuation
(Continued)

data indicative of a fluctuation of a power generation output, and assumed fault data of an assumed fault in the power system, and calculates system influence degree evaluation result data; a computation condition selection index calculation section that calculates a selection index for the computation conditions; and a condition selection section that selects the computation conditions.

15 Claims, 12 Drawing Sheets

(51) Int. Cl.

| | | |
|---|---|---|
| *H02J 3/001* | (2026.01) | |
| *H02J 13/12* | (2026.01) | |
| *H02J 101/20* | (2026.01) | |
| *H02J 103/30* | (2026.01) | |

| | | |
|---|---|---|
| *H02J 105/52* | (2026.01) | |
| *H02J 105/53* | (2026.01) | |

(52) U.S. Cl.
CPC ....... *H02J 2101/20* (2026.01); *H02J 2103/30* (2026.01); *H02J 2105/52* (2026.01); *H02J 2105/53* (2026.01)

(58) Field of Classification Search
USPC ......................................................... 700/293
See application file for complete search history.

(56) References Cited

U.S. PATENT DOCUMENTS

| | | | | |
|---|---|---|---|---|
| 2017/0292824 A1* | 10/2017 | Yamazaki | .............. | G01R 27/16 |
| 2018/0152020 A1* | 5/2018 | Kuroda | ............ | H02J 13/00002 |
| 2019/0391609 A1* | 12/2019 | Kato | ....................... | H02J 3/004 |
| 2020/0293627 A1* | 9/2020 | Wang | .................... | G06F 30/367 |

* cited by examiner

FIG. 5

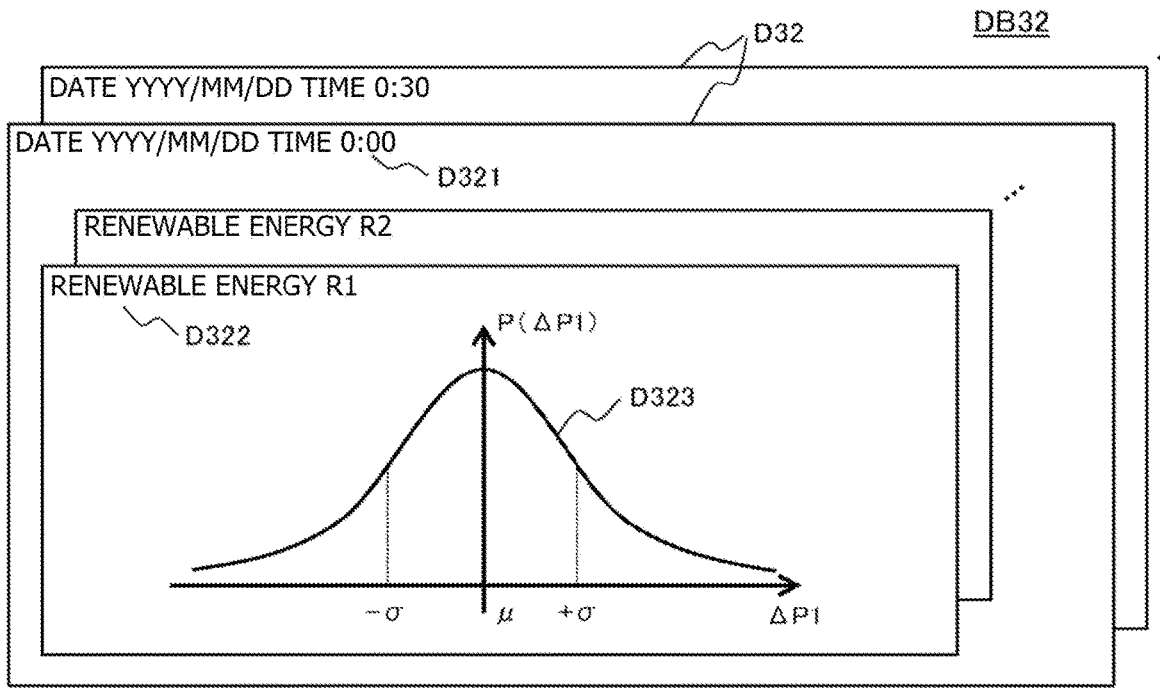

DATE YYYY/MM/DD TIME 0:30

DATE YYYY/MM/DD TIME 0:00
D331

| ASSUMED FAULT CASE | FAULT LOCATION | FAULT MODE | OCCURRENCE PROBABILITY (%) |
|---|---|---|---|
| C1 | POWER TRANSMISSION LINE A1 (POWER SENDING END) | 3φ6LG(ABCA'B'C') | 40 |
| C2 | POWER TRANSMISSION LINE A2 (POWER SENDING END) | 3φ6LG(ABCA'B'C') | 30 |
| C3 | POWER TRANSMISSION LINE A1 (POWER SENDING END) + TRANSMISSION LINE A2 (POWER SENDING END) | 3φ6LG(ABCA'B'C') + 3φ6LG(ABCA'B'C') | 20 |
| C4 | POWER SUPPLY SITE A1 | DROP OUT | 5 |
| C5 | POWER TRANSMISSION LINE B1 (POWER SENDING END) | 3φ6LG(ABCA'B'C') | 0 |
| ⋮ | ⋮ | ⋮ | ⋮ |

D41A
DATE YYYY/MM/DD TIME 0:30

DATE YYYY/MM/DD TIME 0:00
D411A

| RENEWABLE ENERGY | DIRECTION | CONSTRAINT SENSITIVITY |
|---|---|---|
| R1 | POSITIVE | 100 |
| | NEGATIVE | 0 |
| R2 | POSITIVE | 0 |
| | NEGATIVE | 100 |
| R3 | POSITIVE | 0 |
| | NEGATIVE | 0 |
| ⋮ | | ⋮ |

D412A    D413A    D414B

DB41

DB41B

D41B
DATE YYYY/MM/DD TIME 0:30

DATE YYYY/MM/DD TIME 0:00
D411B

| ASSUMED FAULT CASE | SYSTEM STABILIZATION CONTROL AMOUNT | |
|---|---|---|
| | POWER LIMIT AMOUNT [MW] | LOAD LIMIT AMOUNT [MW] |
| C1 | 500 | 500 |
| C2 | 500 | 500 |
| C3 | 1000 | 1000 |
| C4 | 0 | 2000 |
| C5 | 500 | 500 |
| ⋮ | ⋮ | ⋮ |

DATE YYYY/MM/DD TIME 0:30 ~ D42A

DATE YYYY/MM/DD TIME 0:00 ~ D421A

| RENEWABLE ENERGY | DIRECTION | CONSTRAINT SENSITIVITY | STANDARD DEVIATION [MW] | CONSTRAINT CONDITION SELECTION INDEX | CONTROL TARGET SELECTION INDEX |
|---|---|---|---|---|---|
| R1 | POSITIVE | 100 | +10 | 100 | 0 |
| | NEGATIVE | 0 | −10 | 0 | |
| R2 | POSITIVE | 0 | +30 | 0 | −20 |
| | NEGATIVE | 100 | −30 | 100 | |
| R3 | POSITIVE | 0 | +5 | 0 | 5 |
| | NEGATIVE | 0 | −5 | 0 | |
| ⋮ | ⋮ | ⋮ | ⋮ | ⋮ | ⋮ |

D422A   D423A   D424A   D425A   D426A   D427A

DB42

DB42B

DATE YYYY/MM/DD TIME 0:30 ~ D42B

DATE YYYY/MM/DD TIME 0:00 ~ D421B

| ASSUMED FAULT CASE | SYSTEM STABILIZATION CONTROL AMOUNT | | OCCURRENCE PROBABILITY [%] | CONSTRAINT CONDITION SELECTION INDEX |
|---|---|---|---|---|
| | POWER LIMIT AMOUNT [MW] | LOAD LIMIT AMOUNT [MW] | | |
| C1 | 250 | 250 | 50 | 250 |
| C2 | 250 | 250 | 30 | 150 |
| C3 | 1000 | 1000 | 20 | 400 |
| C4 | 0 | 2000 | 5 | 100 |
| C5 | 500 | 500 | 0 | 0 |
| ⋮ | ⋮ | ⋮ | ⋮ | ⋮ |

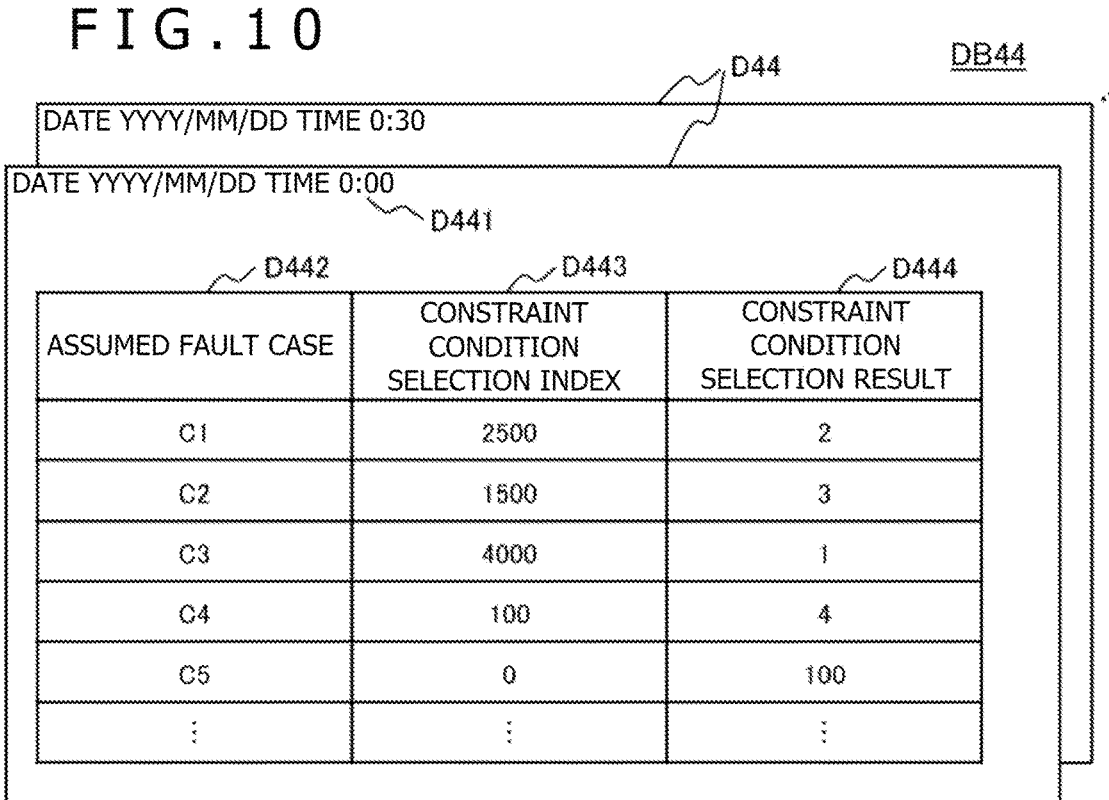

DB43

D43

DATE YYYY/MM/DD TIME 0:30

DATE YYYY/MM/DD TIME 0:00          D431

| RENEWABLE ENERGY D432 | DIRECTION D433 | CONSTRAINT CONDITION SELECTION INDEX D434 | CONSTRAINT CONDITION SELECTION RESULT D435 |
|---|---|---|---|
| R1 | POSITIVE | 100 | 1 |
| | NEGATIVE | 0 | 0 |
| R2 | POSITIVE | 0 | 0 |
| | NEGATIVE | 100 | 1 |
| R3 | POSITIVE | 0 | 0 |
| | NEGATIVE | 0 | 0 |
| ⋮ | ⋮ | ⋮ | ⋮ |

DATE YYYY/MM/DD TIME 0:30

DATE YYYY/MM/DD TIME 0:00          D441

| ASSUMED FAULT CASE D442 | CONSTRAINT CONDITION SELECTION INDEX D443 | CONSTRAINT CONDITION SELECTION RESULT D444 |
|---|---|---|
| C1 | 2500 | 2 |
| C2 | 1500 | 3 |
| C3 | 4000 | 1 |
| C4 | 100 | 4 |
| C5 | 0 | 100 |
| ⋮ | ⋮ | ⋮ |

DATE YYYY/MM/DD TIME 0:30 ~D45

DATE YYYY/MM/DD TIME 0:00 ~D451

| RENEWABLE ENERGY | CONTROL TARGET SELECTION INDEX | CONTROL TARGET SELECTION RESULT |
|---|---|---|
| R1 | 0 | 1 |
| R2 | ~20 | 0 |
| R3 | 5 | 1 |
| ⋮ | ⋮ | ⋮ |

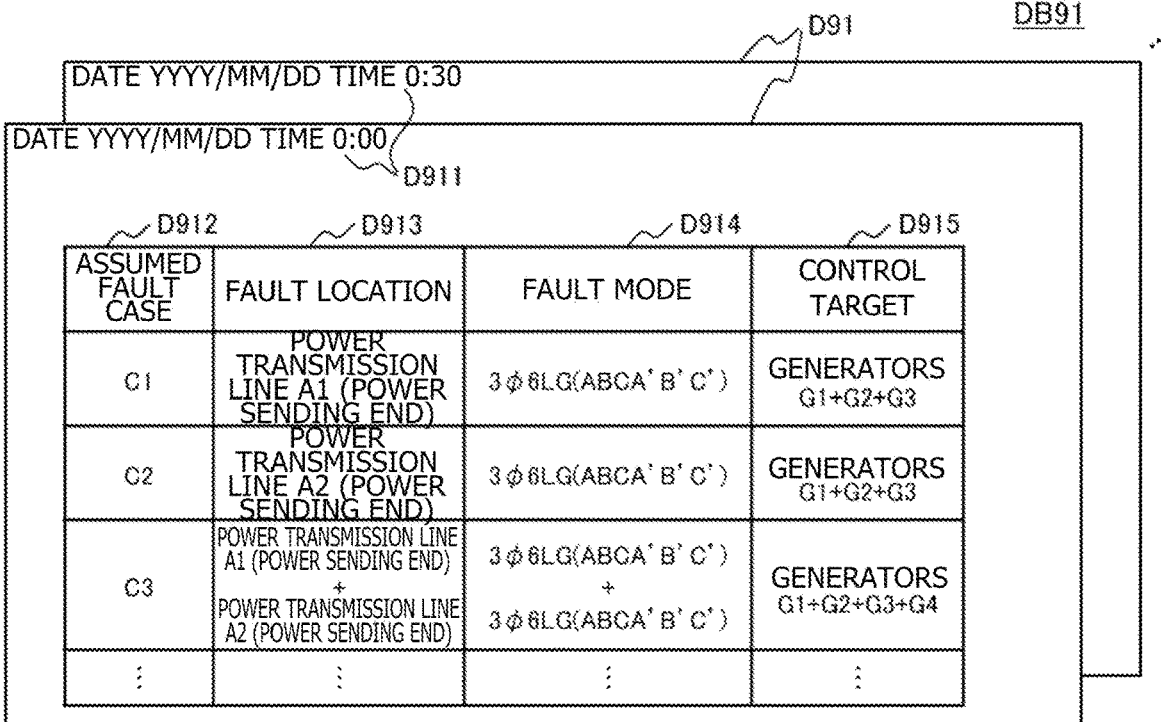

DB91

DATE YYYY/MM/DD TIME 0:30 ~D91

DATE YYYY/MM/DD TIME 0:00 ~D911

| ASSUMED FAULT CASE | FAULT LOCATION | FAULT MODE | CONTROL TARGET |
|---|---|---|---|
| C1 | POWER TRANSMISSION LINE A1 (POWER SENDING END) | 3φ6LG(ABCA'B'C') | GENERATORS G1+G2+G3 |
| C2 | POWER TRANSMISSION LINE A2 (POWER SENDING END) | 3φ6LG(ABCA'B'C') | GENERATORS G1+G2+G3 |
| C3 | POWER TRANSMISSION LINE A1 (POWER SENDING END) + POWER TRANSMISSION LINE A2 (POWER SENDING END) | 3φ6LG(ABCA'B'C') + 3φ6LG(ABCA'B'C') | GENERATORS G1+G2+G3+G4 |
| ⋮ | ⋮ | ⋮ | ⋮ |

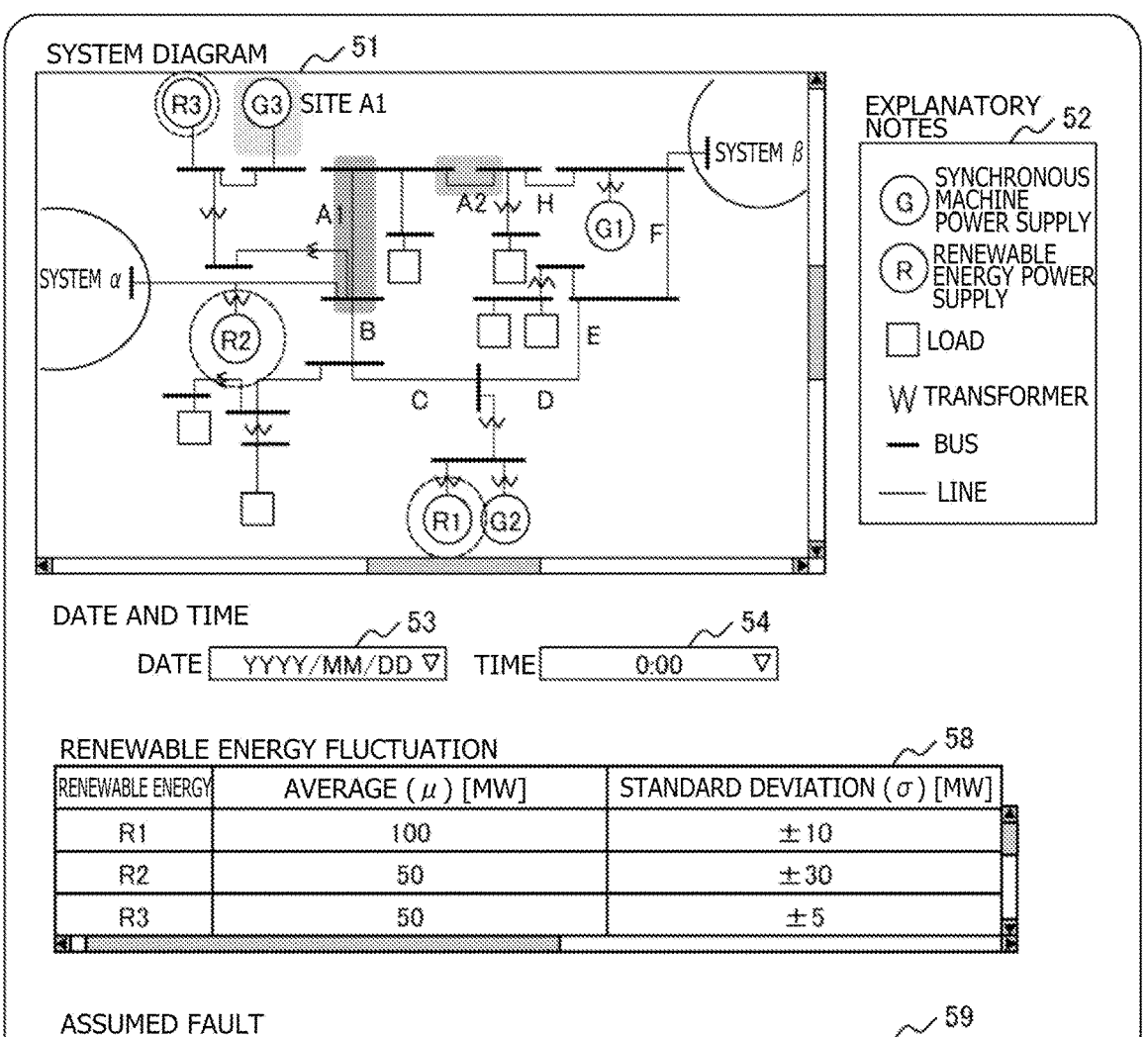

SYSTEM DIAGRAM ⌇51

SITE A1

SYSTEM β

SYSTEM α

EXPLANATORY NOTES ⌇52

(G) SYNCHRONOUS MACHINE POWER SUPPLY (R) RENEWABLE ENERGY POWER SUPPLY

☐ LOAD

W TRANSFORMER

— BUS

— LINE

DATE AND TIME ⌇53

DATE | YYYY/MM/DD ▽ |    TIME | 0:00 ▽ | ⌇54

RENEWABLE ENERGY FLUCTUATION ⌇58

| RENEWABLE ENERGY | AVERAGE ($\mu$) [MW] | STANDARD DEVIATION ($\sigma$) [MW] |
|---|---|---|
| R1 | 100 | ±10 |
| R2 | 50 | ±30 |
| R3 | 50 | ±5 |

ASSUMED FAULT ⌇59

| ASSUMED FAULT CASE | FAULT LOCATION | FAULT MODE | OCCURRENCE PROBABILITY |
|---|---|---|---|
| C1 | POWER TRANSMISSION LINE A1 (POWER SENDING END) | 3φ6LG(ABCA'B'C') | 40 |
| C2 | POWER TRANSMISSION LINE A2 (POWER SENDING END) | 3φ6LG(ABCA'B'C') | 30 |
| C3 | POWER TRANSMISSION LINE A1 (POWER SENDING END) + POWER TRANSMISSION LINE A2 (POWER SENDING END) | 3φ6LG(ABCA'B'C') + 3φ6LG(ABCA'B'C') | 20 |
| C4 | POWER SUPPLY SITE A1 | DROP OUT | 5 |
| C5 | POWER TRANSMISSION LINE B1 (POWER SENDING END) | 3φ6LG(ABCA'B'C') | 0 |

POWER SYSTEM SUPERVISORY CONTROL APPARATUS, SYSTEM, AND METHOD USING SUPPLY RELIABILITY

TECHNICAL FIELD

The present invention relates to a power system supervisory control apparatus, a power system supervisory control system, and a power system supervisory control method that can achieve social cost reduction and resilience improvement.

BACKGROUND ART

In comparison with electric energy that is generated and consumed by an overall power system, energy that can be stored is less. Therefore, in operation of the power system, it is necessary to comply with "simultaneous equal amount" that always keeps the difference between the power generation amount and the power demand amount within a fixed range.

Although generated electric power is supplied to customers through a power transmission line, the upper limit of the electric power amount that can be flowed through each power transmission line depends on the operation capacity of the power transmission line. An operator of the power system calculates, on the basis of results of simulations, desk studies, or the like performed in advance, a thermal capacity, an electric power capacity with which the stability (transient stability, voltage stability, frequency, and so forth) when a fault occurs can be maintained, and so forth for each power transmission line, and sets the lowest value (namely, the most severe value) from among the calculated values as the operation capacity of the power transmission line.

Where the operation capacity is determined on the basis of constraints based on stability maintenance in the event of a fault, utilization of a system stabilization system can increase the electric power amount to be flowed to the power transmission line (relax operational standards). Here, the "system stabilization system" signifies a system that has a function of preventing that, when a fault occurs with the power system due to earthquake, thunderbolt, tsunami, or the like, the influence of the fault spreads to a situation in which a big blackout may possibly be caused.

The system stabilization system evaluates, for each of a plurality of faults that can be assumed, an influence (supply reliability degree) on the power system in a case where the fault occurs, and holds a control table in which generators (power limitation targets) from which supply of power is to be limited and targets (load limitation targets) for which the load is to be limited in order to stably maintain the power system are registered. When a fault actually occurs with the power system, the system stabilization system refers to the control table to determine a power limitation target or a load limitation target according to the contents of the fault, and takes such a countermeasure as to disconnect the determined power limitation target or load limitation target from the power system, thereby to maintain the stability of the power system. By such a function of the system stabilization system as just described, it is possible to maintain the stability of the power system when a fault occurs, and since also it is possible to increase the electric power amount to be flowed to the power transmission line, the operation capacity can be relaxed. By relaxing the operation capacity, the power generation amount of a low cost power supply can be increased, and therefore, the social cost can be reduced.

In order to maintain the stability of the power system by the system stabilization system, it is important to calculate a control table according to a state of the power system. In a conventional power system centered on the supply of electric power by a large scale centralized power supply by thermal power generation, hydroelectric power generation, or nuclear power generation, the power generation amount is determined on the basis of a power generation plan formulated by an operator in advance. Therefore, the fluctuation of the tidal current is a little, and also the control table in the system stabilization system can be calculated comparatively easily.

On the other hand, with the spread of a renewable energy power supply (hereinafter referred to merely as renewable energy), the power system is changing globally from a conventional power system including large scale centralized power supplies to a power system centered on distributed power supplies. The renewable energy is also called output fluctuation type power supply and has a characteristic that the output changes depending upon a meteorological condition. Therefore, such a situation occurs that the power generation amount does not coincide with a power generation plan formulated in advance or that the tidal current state changes steeply in a short period of time, and this makes it difficult to appropriately grasp the state of the power system.

As a background art relating to supply reliability evaluation and working out of countermeasures for a power system against an assumed fault or a renewable energy fluctuation, Patent Document 1 is known. Patent Document 1 makes a description that "a power system reliability degree evaluation system that evaluates a supply reliability degree of electric power when an assumed accident occurs in a power system that includes a renewable energy power supply, including: a system state estimation section that estimates a future system state on the basis of measurement information including at least one of a voltage, a phase, a load, a generator output, or a tidal current at a plurality of locations in the power system, renewable energy output prediction information including a prediction value of the output of the renewable energy power supply, a value greater by a predetermined amount than the prediction value and a value smaller by a predetermined amount than the prediction value, demand prediction information of the electric power in the power system, and operation plan information relating to supply of electric power in the power system; and a reliability degree evaluation section that evaluates the supply reliability degree on the basis of the future system state estimated by the system state estimation section, assumed accident information including a plurality of assumed accident modes, and the renewable energy output prediction information.

PRIOR ART DOCUMENT

Patent Document

Patent Document 1: JP-2019-30065-A

SUMMARY OF THE INVENTION

Problem to be Solved by the Invention

Although Patent Document 1 uses information of an assumed fault and renewable energy output prediction in order to evaluate the supply reliability degree of a power system, it is silent of selection of an assumed fault or a renewable energy that is to be made an evaluation target. Therefore, in a case where Patent Document 1 is applied to a system stabilization system, since a very large number of patterns are available in regard to an assumed fault and a renewable energy, there is a problem that control table calculation cannot be performed in a short cycle according to the system state that changes steeply in a short period of time.

Further, Patent Document 1 uses information including, in regard to an output prediction value of a renewable energy, a value higher by a predetermined amount than the prediction value and a value smaller by a predetermined value than the prediction value. In a case where a high value is used as the predetermined value to perform evaluation of the supply reliability degree and calculation of a control table, it is possible to maintain the system stability against a great renewable energy fluctuation. On the other hand, since use of a high value anticipates an excessive margin, the relax amount of the operation capacity decreases. In addition, in recent years, the frequency of occurrence of an event called rare frequency large-scale disaster such as typhoon or earthquake is increasing.

Although an assumed fault is set on the basis of results of a simulation or a desk study in advance and so forth, since the frequency of occurrence of such events is very low, faults arising from occurrence of such disasters ((4 equipment fault) (N–4 fault), power supply one-site dropout, or the like) are not made a target. Therefore, a control table ready for such disasters cannot be calculated, and when such a disaster occurs, there is the possibility that a big blackout (blackout) may occur.

From the foregoing, it is an object of the present invention to provide a power system supervisory control apparatus, a power system supervisory control system, and a power system supervisory control method that can implement reduction of the social cost and improvement of the resilience of a power system.

Means for Solving the Problem

In order to solve the subject described above, for example, configurations described in the claims are adopted. Although the present application includes a plurality of means for solving the subject described above, one example of the means is "a power system supervisory control apparatus for supervising and controlling a power system including a plurality of renewable energy power supplies, the power system supervisory control apparatus including: a system influence degree evaluation section that evaluates a system influence degree when a renewable energy fluctuation or an assumed fault has an influence on the power system by using, as computation conditions, system data that is data for obtaining a state of the power system, renewable energy fluctuation data indicative of a fluctuation of a power generation output for each of the renewable energy power supplies, and assumed fault data that is data of an assumed fault in the power system, and calculates system influence degree evaluation result data; a computation condition selection index calculation section that calculates a selection index for the computation conditions by using the system influence degree evaluation result data to calculate computation condition selection index calculation result data; and a condition selection section that selects the computation conditions, the condition selection section including any one or more of a renewable energy fluctuation condition selection section that selects a renewable energy fluctuation condition in the computation conditions by using the computation condition selection index calculation result data, an assumed fault condition selection section that selects an assumed fault condition in the computation conditions, and a control target condition selection section that selects a control target indicated by the assumed fault data in the computation conditions.

Further, the present invention is characterized by "being configured from a power system supervisory control apparatus, and a system stabilization system including a control table calculation section that retains a computation condition obtained by the condition selection section of the power system supervisory control apparatus and creates a control table when an assumed fault occurs."

Further, the present invention is characterized in "a power system supervisory control method for supervising and controlling a power system including a plurality of renewable energy power supplies, the power system supervisory control method including: evaluating a system influence degree when a renewable energy fluctuation or an assumed fault has an influence on the power system by using, as computation conditions, system data that is data for obtaining a state of the power system, renewable energy fluctuation data indicative of a fluctuation of a power generation output for each of the renewable energy power supplies, and assumed fault data that is data of an assumed fault in the power system; calculating a selection index for the computation conditions by using a result of the evaluation of the system influence degree; and selecting the computation conditions, in which, when the selection of the computation conditions is to be performed, any one or more of selection of a renewable energy fluctuation condition in the computation conditions using the calculated selection index in the computation conditions, selection of an assumed fault condition in the computation conditions, and selection of a control target in the computation conditions are performed."

Advantages of the Invention

With the present invention, reduction of the social cost and resilience improvement of a power system can be implemented.

BRIEF DESCRIPTION OF THE DRAWINGS

FIG. 5 is a diagram depicting renewable energy fluctuation data D32 stored in a renewable energy fluctuation database DB32.

FIG. 6 is a view depicting an example of assumed fault data D33 stored in an assumed fault database DB33.

FIG. 7 is a view depicting an example of system influence degree evaluation result data D41 stored in a system influence degree evaluation result database DB41.

FIG. 8 is a view depicting an example of computation condition selection index calculation result data D42 stored in a computation condition selection index calculation result database DB42.

FIG. 9 is a view depicting an example of renewable energy fluctuation condition selection result data D43 stored in a renewable energy fluctuation condition selection result database DB43.

FIG. 10 is a view depicting an example of assumed fault condition selection result data D44 stored in an assumed fault condition selection result database DB44.

FIG. 11 is a view depicting an example of control target selection result data D45 stored in a control target selection result database DB45.

FIG. 12 is a view depicting an example of control table calculation result data D91 stored in a control table calculation result database DB91.

FIG. 15 is a view depicting another example of a screen display image of the power system supervisory control apparatus according to the embodiment 1.

MODE FOR CARRYING OUT THE INVENTION

In the following, an embodiment of the present invention is described.

Embodiment

Figure 1:
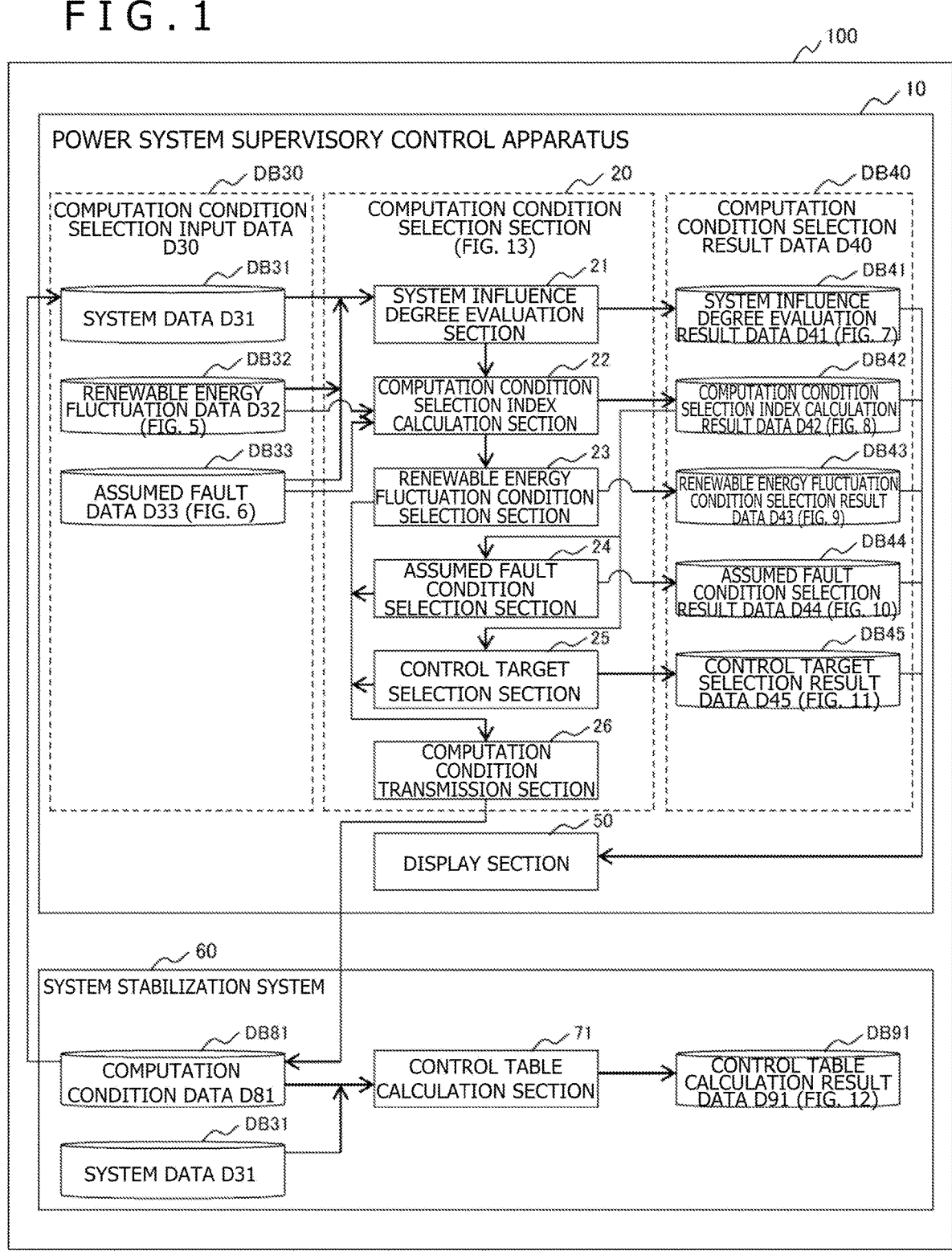
FIG. 1 is a block diagram depicting an example of a general configuration of a power system supervisory control apparatus according to an embodiment 1.
Figure 2:
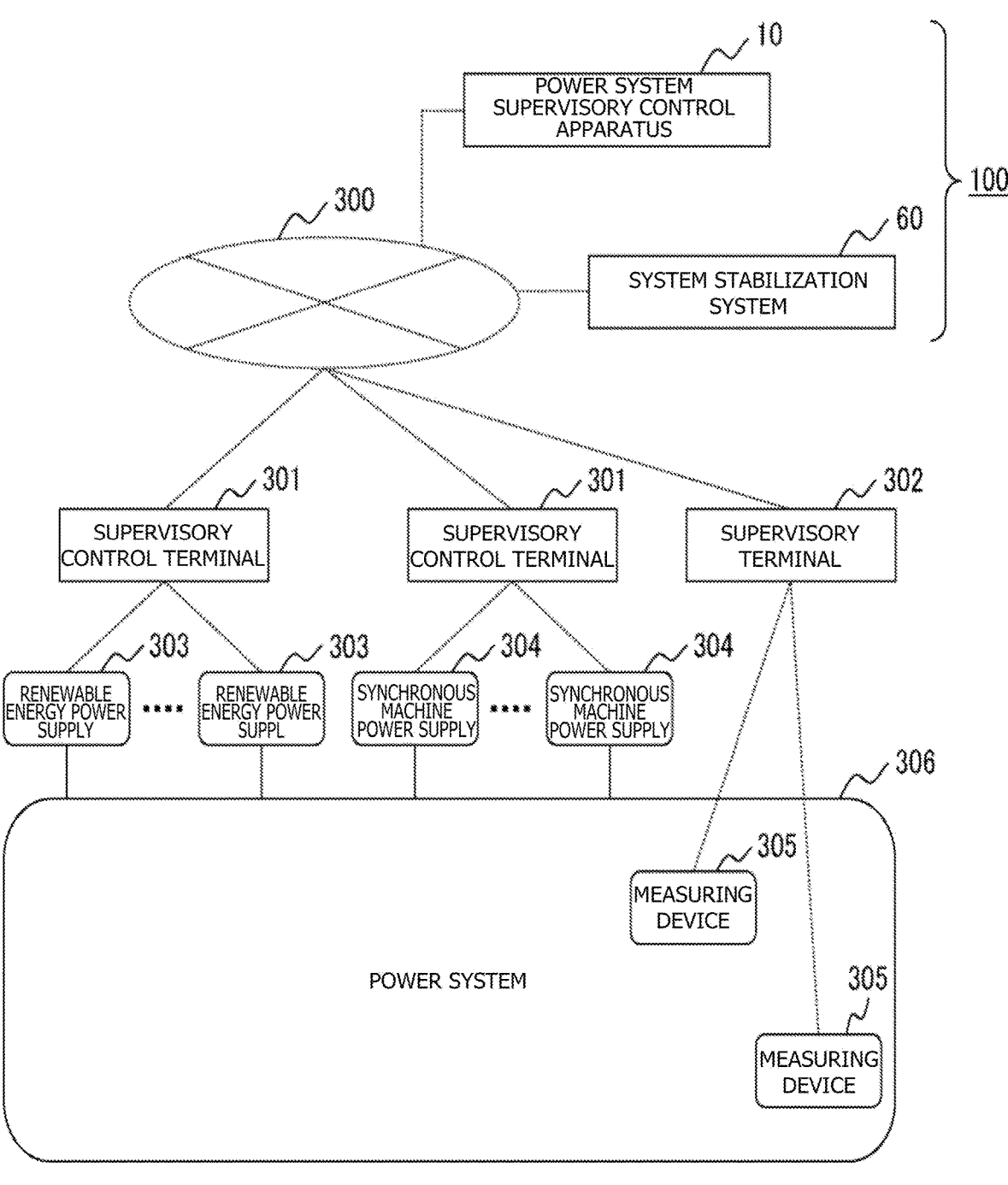
FIG. 2 is a block diagram depicting an example of a general configuration of a power system supervisory control system as viewed specifically from a point of view of hardware on the outside of the power system supervisory control apparatus.

First, an example of a configuration of a power system and a power system supervisory control system according to the present invention is described. FIG. 2 is a view depicting an example of a general configuration from a point of view of hardware in a case where a power system supervisory control system 100 configured from a power system supervisory control apparatus 10 and a system stabilization system 60 of FIG. 1 is applied to a power system 306.

As exemplified in FIG. 2, the power system 306 includes synchronous machine power supplies 304 of thermal power generation, nuclear power generation, hydroelectric power generation, and so forth, and renewable energy power supplies 303 of photovoltaic power generation, wind power generation and so forth as power supplies, loads, various control equipment, and measuring devices 305.

The power system supervisory control apparatus 10 transmits and receives data, via a communication network 300, to and from supervisory control terminals 301 that supervise and control the power supplies (synchronous machine power supplies 304 and renewable energy power supplied 303) in the power system 306 and a supervisory terminal 302 that supervises the measuring devices 305 that measure the tidal current distribution in the power system 306, and further cooperates with the system stabilization system 60.

Note that it is assumed that the power system supervisory control system 100 is configured from the power system supervisory control apparatus 10 and the system stabilization system 60. It is to be noted that the system stabilization system 60 here prepares countermeasures in the event of occurrence of an assumed fault in advance, for example, from a point of view of system stability, and executes, when the assumed fault actually occurs, the countermeasures prepared in advance. Further, the power system supervisory control apparatus 10 continuously supervises the state of the power system, and provides and prescribes various settings required for computation such as tidal current computation in the system stabilization system 60.

FIG. 1 is a block diagram depicting an example of a general configuration of the power system supervisory control system 100 in the embodiment 1. It is to be noted that FIG. 1 depicts the power system supervisory control system 100 where the power system supervisory control apparatus 10 and the system stabilization system 60 are implemented by a computer, from a point of view of a configuration of processing functions executed by computation sections of them and a point of view of databases DB that store input and output data to be used in the computation and data as intermediate products in intermediate stages of the processing.

The power system supervisory control apparatus 10 is configured from a computation condition selection input database DB30, a computation condition selection section 20, a computation condition selection result database DB40, and a display section 50.

In regard to the power system supervisory control apparatus 10, various processing functions executed by the computation section are enumerated in the computation condition selection section 20, and the various databases DB on the input side are enumerated in the computation condition selection input data database DB30 while the various databases DB on the output side are enumerated in the computation condition selection result data database DB40.

Further, in regard to the system stabilization system 60, the processing function executed by the computation section is a control table calculation section 71, and the various databases DB on the input side are a computation condition data database DB81 and a system data database DB31 while the database DB on the output side is a control table calculation result data database DB91.

In the power system supervisory control apparatus 10 of FIG. 1, as hereinafter described particularly, a system influence degree evaluation section 21 acquires system data D31, renewable energy fluctuation data D32, and assumed fault data D33 from the respective databases DB31, DB32, and DB33 by the configuration described hereinabove and uses them to evaluate an influence degree on the system when an assumed fault and a renewable energy fluctuation occur, and a computation condition selection index calculation section 22 calculates a computation condition selection index for the system stabilization system on the basis of a result of the system influence evaluation. Then, selection sections 23, 24, and 25 select a renewable energy fluctuation condition, an assumed fault condition, and a control target that are computation conditions for the system stabilization system on the basis of a result of calculation of the computation condition selection index, and a computation condition transmission section 26 transmits the selected computation conditions to the system stabilization system 60, and the system influence degree evaluation result data D41, computation condition selection index calculation result data D42, renewable energy fluctuation condition selection result data D43, assumed fault condition selection result data D44, and control target selection result data D45 are output to the respective databases DB41, DB42, DB43, DB44 and DB45 so as to be retained by them.

Meanwhile, in the system stabilization system 60, as hereinafter described particularly, the control table calculation section 71 acquires and uses computation condition data D81 and system data D31 from the respective databases DB81 and DB31 by the configuration described hereinabove to calculate a control target necessary to maintain the system stability against each assumed fault and a renewable energy fluctuation, and outputs a result of the calculation as control table calculation result data D91 to the database DB91 so as to be retained by them.

In the following, description is given beginning with the computation condition selection input database DB30 on the input side. The computation condition selection input database DB30 is configured from the following databases DB31 to DB33.

In the system database DB31, the system data D31 is stored. The system data D31 is data for obtaining a state of the power system. In particular, the system data D31 is stored as a system configuration, a line impedance (R+jX), an earth capacitance (susceptance: jB), data necessary for the system configuration and state estimation (a threshold value for bad data and so forth), generator data, and other data necessary for tidal current calculation, state estimation, and time series change calculation.

The renewable energy fluctuation database DB32 has stored therein the renewable energy fluctuation data D32 exemplified in FIG. 5. The assumed fault database DB33 has stored therein the assumed fault data D33 exemplified in FIG. 6. It is to be noted that details of FIGS. 5 and 6 are hereinafter described. Here, only a general relation is described.

Figure 13:
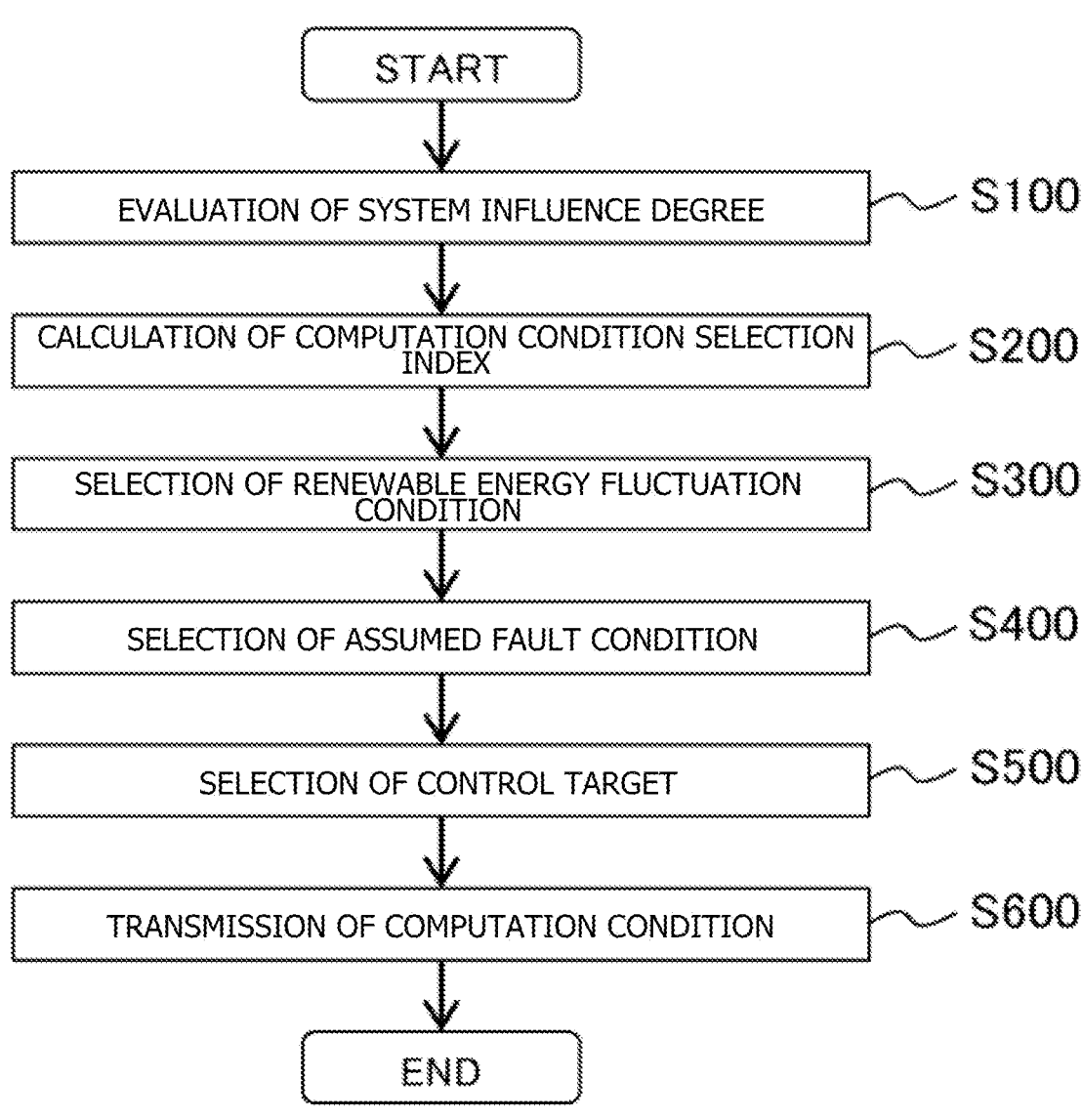
FIG. 13 is a flow chart depicting an example of contents of a computation condition selection process of the power system supervisory control apparatus according to the embodiment 1.

The computation condition selection section 20 is a function for selecting a computation condition for the system stabilization system 60, and contents of a series of processes of the function are depicted in a flow chart of FIG. 13. Further, the computation condition selection section 20 is configured from the processing functions 21 to 26 described below.

The system influence degree evaluation section 21 in the computation condition selection section 20 is a function for evaluating the influence degree on the system when an assumed fault and a renewable energy fluctuation occur. The system influence degree evaluation section 21 uses the system data D31, renewable energy fluctuation data D32, and assumed fault data D33 to evaluate the influence degree on the system and outputs system influence degree evaluation result data D41.

The computation condition selection index calculation section 22 is a function for calculating an index for selecting a computation condition for the system stabilization system 60. The computation condition selection index calculation section 22 uses the system influence degree evaluation result data D41 to calculate a computation condition selection index and outputs computation condition selection index calculation result data D42.

The renewable energy fluctuation condition selection section 23 is a function for selecting a renewable energy fluctuation condition in the computation condition. The renewable energy fluctuation condition selection section 23 uses the computation condition selection index calculation result data D42 to select a renewable energy fluctuation condition and outputs renewable energy fluctuation condition selection result data D43.

The assumed fault condition selection section 24 is a function for selecting an assumed fault condition in the computation condition. The assumed fault condition selection section 24 uses the computation condition selection index calculation result data D42 to select an assumed fault condition and outputs assumed fault condition selection result data D44.

The control target selection section 25 is a function for selecting a control target condition in the computation condition. The control target selection section 25 uses the computation condition selection index calculation result data D42 to select a control target condition and outputs control target selection result data D45.

It is to be noted that, in selection operations by the selection sections (computation condition selection index calculation section 22, renewable energy fluctuation condition selection section 23, and assumed fault condition selection section 24), data selected by internal processing (computation condition selection index calculation result data D42, renewable energy fluctuation condition selection result data D43, and control target selection result data D45) may be automatically stored into the databases DB (computation condition selection index calculation result database DB42, renewable energy fluctuation condition selection result database DB43, and control target selection result database DB45) or may be stored into the databases DB after they are displayed once on a screen of a monitor or the like so as to be presented to an operator and then a result of the decision is taken into account of them.

The computation condition transmission section 26 is a function for transmitting a computation condition to the system stabilization system 60. The computation condition transmission section 26 transmits the renewable energy fluctuation condition selection result data D42, assumed fault condition selection result data D44, and control target selection result data D45 to the system stabilization system 60.

The computation condition selection result data D40 on the output side is configured from databases DB41 to DB45 described below.

The system influence degree evaluation result database DB41 has stored therein the system influence degree evaluation result data D41 that is exemplified in FIG. 7. The computation condition selection index calculation result database DB42 has stored therein the computation condition selection index calculation result data D42 that is exemplified in FIG. 8. The renewable energy fluctuation condition selection result database DB43 has stored therein the renewable energy fluctuation condition selection result data D43 that is exemplified in FIG. 9. The assumed fault condition selection result database D44 has stored therein the assumed fault condition selection result data D44 that is exemplified in FIG. 10. The control target selection result database DB45 has stored therein the control target selection result data D45 that is exemplified in FIG. 11.

It is to be noted that the data stored in the computation condition selection result database DB40 are not only data as computation results but also data of results at intermediate process points in time, and can be diverted at appropriate occasions. Detailed examples of the storage contents are hereinafter described.

On the display section 50, various data handled in the power system supervisory control apparatus 10 are worked and suitably displayed in a form easy to see. Further, the function of the display section 50 includes inputting means such as a mouse and a keyboard, and a result of inputting is suitably reflected on the display screen of the display section 50.

Figure 3:
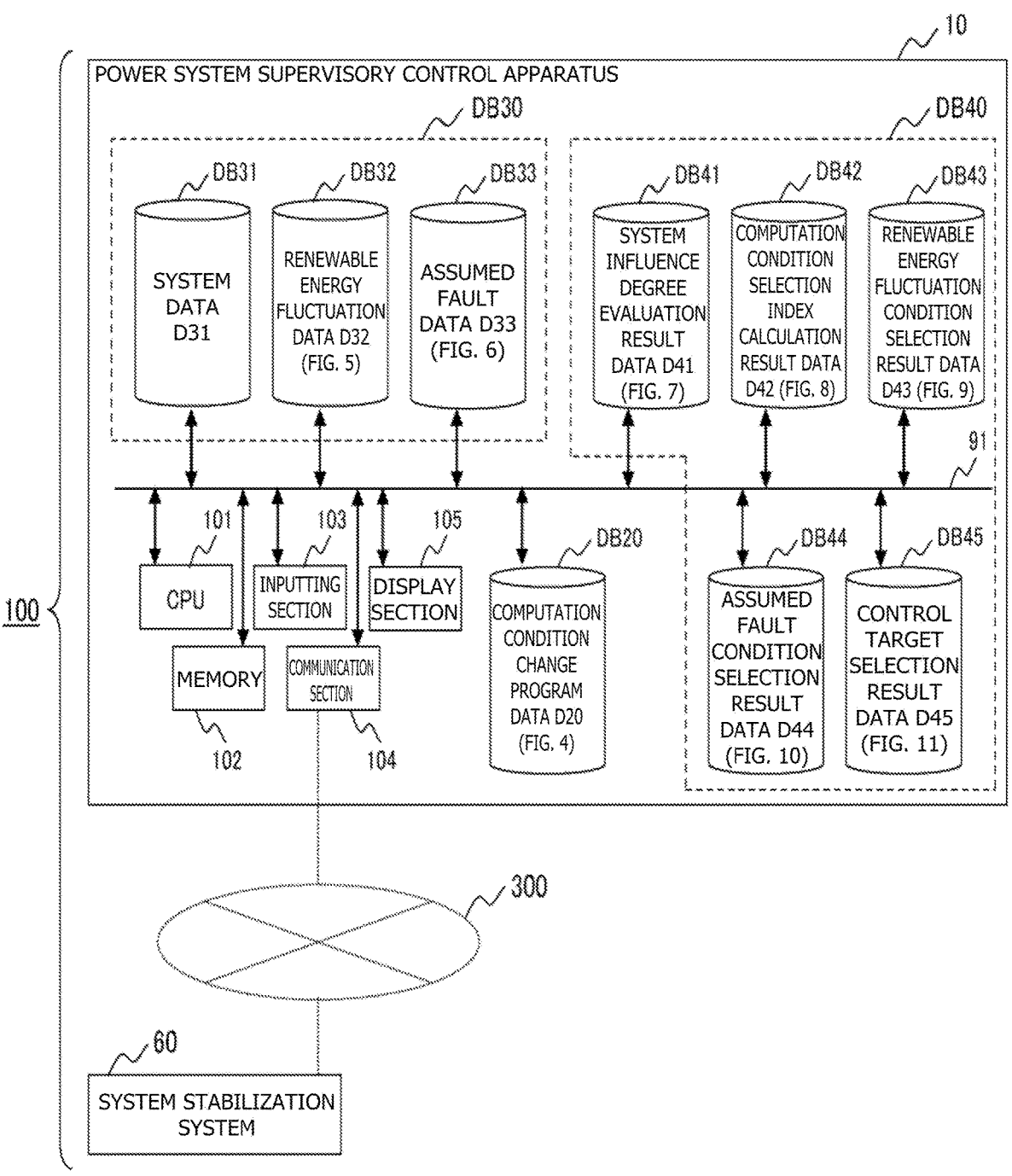
FIG. 3 is a block diagram depicting an example of a general configuration of the power system supervisory control system as viewed specifically from a database and hardware in the inside of the power system supervisory control apparatus.

FIG. 3 is a block diagram depicting an example of a general configuration of the power system supervisory control system in a case where the power system supervisory control apparatus 10 of FIG. 1 is applied especially from a point of view of the databases and the hardware of the power system supervisory control apparatus 10.

The hardware configuration of the power system supervisory control apparatus 10 depicted in FIG. 3 is described. In the power system supervisory control apparatus 10, a display section 105, an inputting section 103 such as a keyboard and a mouse, a communication section 104, a computer or calculator server (CPU: Central Processing Unit) 101, a memory 102, a computation condition selection input database DB30 (system database DB31, renewable energy fluctuation database DB32 and assumed fault database DB33), a computation condition selection result database DB40 (system influence degree evaluation result database DB41, computation condition selection index calculation result database DB42, renewable energy fluctuation condition selection result database DB43, assumed fault condition selection result database DB44, and control target selection result database DB45), and a computation condition selection program database DB20 are connected to a bus line 91.

Among the components, the display section 105 is configured, for example, as a display device. The display section 105 may otherwise be configured such that, for example, a printer device, a sound outputting device or the like is used in place of or together with the display device.

The inputting section 103 can be configured using at least one of, for example, a keyboard switch, a pointing device such as a mouse, a touch panel, or a voice instruction device.

The communication section 104 includes a circuit and a communication protocol for connecting to the communication network 300.

The CPU 101 reads in a predetermined computer program from the assumed fault condition change program database DB20 and executes the computer program. The CPU 101 may be configured as a single semiconductor chip or a plurality of semiconductor chips, or may be configured as a computer device like a calculation server.

The memory 102 is configured, for example, as a RAM (Random Access Memory) and stores a computer program read out from the assumed fault condition change program database DB20, or stores calculation result data, image data, and so forth necessary for various processes. Screen image data stored in the memory 102 is sent to and displayed by the display section 105. An example of the screen image to be displayed is hereinafter described.

Figure 4:
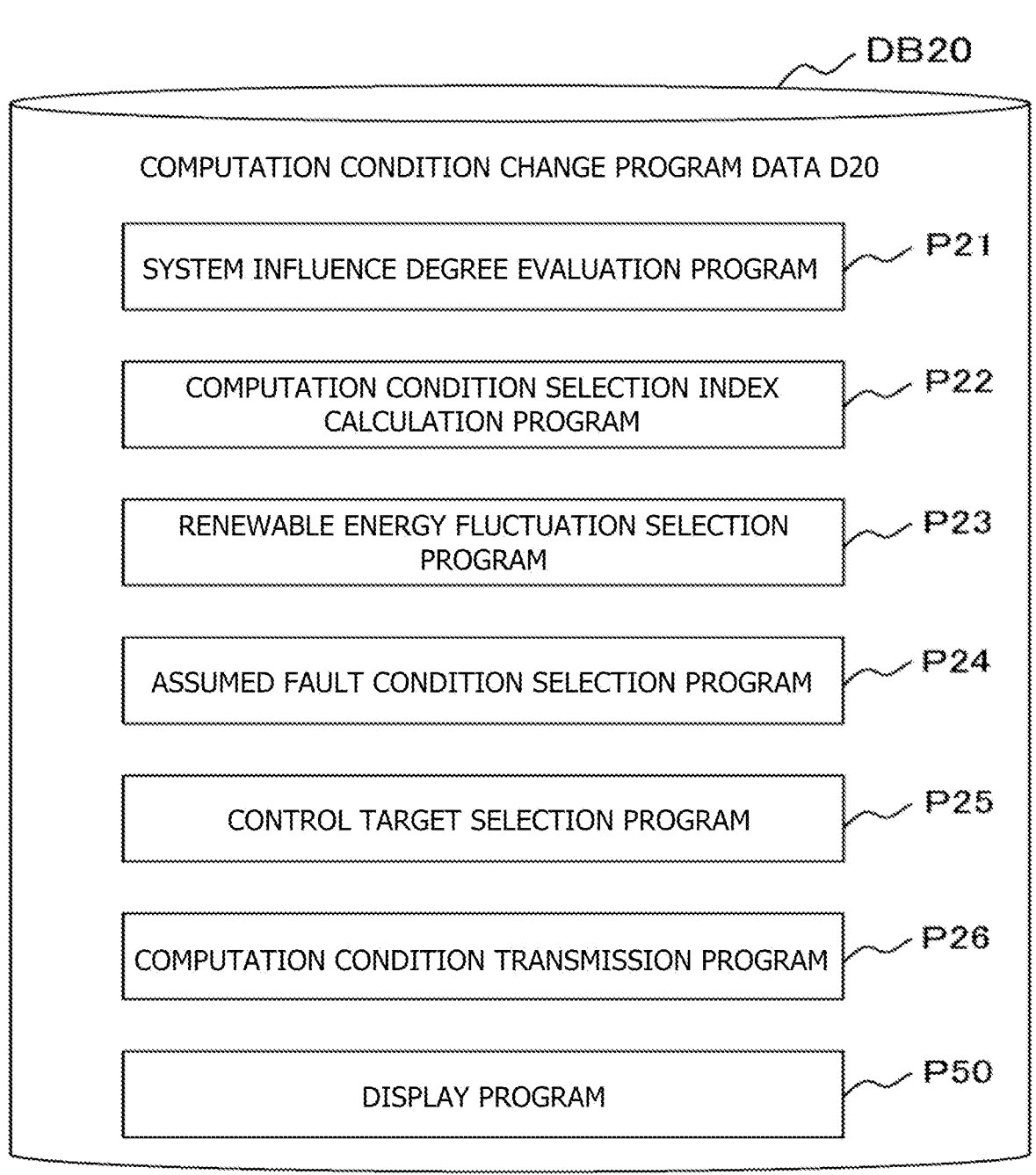
FIG. 4 is a block diagram depicting an example of a configuration indicative of contents of computation condition selection program data of the power system supervisory control apparatus.

Here, storage contents of the computation condition selection program database DB20 are described with reference to FIG. 4. FIG. 4 is a block diagram depicting an example of a configuration indicative of contents of program data of the power system supervisory control apparatus 10. In the computation condition selection program database DB20, for example, a system influence degree evaluation program P21, a computation condition selection index calculation program P22, a renewable energy fluctuation condition selection program P23, an assumed fault condition selection program P24, a control target selection program P25, a computation condition transmission program P26, and a display program P50 are stored.

Referring back to FIG. 3, the CPU 101 executes a computation program (system influence degree evaluation program P21, computation condition selection index calculation program P22, renewable energy fluctuation condition selection program P23, assumed fault condition selection program P24, control target selection program P25, computation condition transmission program P26, or display program P50) read out from the computation condition selection program database DB20 into the memory 102 to perform evaluation of a system influence degree, calculation of a computation condition selection index, selection of a renewable energy fluctuation condition, selection of an assumed fault condition, selection of a control target, transmission of a computation condition, instruction of image data to be displayed, search of data in the various databases, and so forth.

The memory 102 is a memory that stores once calculation temporary data and calculation result data of image data for display, system influence degree evaluation result data D41, computation condition selection index calculation result data D42, renewable energy fluctuation condition selection result data D43, assumed fault condition selection result data D44, control target selection result data D45, and so forth, and necessary image data is generated by the CPU 101 and displayed on the display section 105 (for example, a display screen of a display). It is to be noted that the display section 105 of the power system supervisory control apparatus 10 may be only a simple screen only for performing rewriting of some control program or database.

As depicted in FIG. 1, three databases by rough division are stored in the system stabilization system 60. In the computation condition data database DB81, computation conditions sent thereto from the power system supervisory control apparatus 10 (renewable energy fluctuation condition selection result data D43, assumed fault condition selection result data D44, and control target selection result data D45) are stored. Description of the system data database DB31 is omitted because it is described already.

In the control table calculation result database DB91, control table calculation result data D91 is stored as depicted in FIG. 12. The control table calculation result data D91 is a data group of a table format created for each date and time D911, and in the example depicted in FIG. 1, data groups at time 0:00 and time 0:30 are exemplified. The control table calculation result data D91 is data of control targets D915 corresponding to assumed fault case IDs (D912), and represents that, when a fault corresponding to an assumed fault case ID (D912) occurs, the corresponding control target D915 is controlled by the system stabilization system 60. Time and date D911 may otherwise be an optional time interval. The assumed fault case ID (D912) is configured from a fault location D913, a fault mode D914, and so forth. The fault mode D914 is a combination of a phase, a line number and a fault mode of a fault line or lines.

Here, the assumed fault case ID (D912) in FIG. 12 assumes C1, C2, and C3, and that each of C1 and C2 is a single fault of a transmission line and that C3 is multiple faults are described in the fields for the fault location D913 and the fault mode D914, respectively, and that, while the control target in the case of a single fault is three generators, the control target in the case of multiple faults is four generators is described in the control target D915 together with particular equipment names.

It is to be noted that, in FIG. 12, 3φ6LG(ABCA'B'C') signifies a three-phase six-wire ground fault and represents that the A phase, B phase, C phase, A' phase, B' phase, and C' phase suffer from a ground fault. The control target D915 is a generator, a load, or the like. It may otherwise be a battery, a rechargeable/dischargeable secondary cell, an EV storage battery, a flywheel, phase modifying equipment, or the like. Generators G1+G2+G3 in FIG. 12 represents that the power limitation target is the generator G1, generator G2, and generator G3, and represents that the generator G1, generator G2, and generator G3 are disconnected as control targets from the power system. This makes it possible for the system stabilization system 60 to control the control target corresponding to each time and each fault.

In the power system supervisory control apparatus 10, eight databases by rough division are stored. In the following, the computation condition selection input database DB30 (renewable energy fluctuation database DB32 and assumed fault database DB33) excluding the system data database DB31 described already and the computation condition selection result database DB40 (system influence degree evaluation result database DB41, computation condition selection index calculation result database DB42, renewable energy fluctuation condition selection result database DB43, assumed fault condition selection result database DB44, and control target selection result database DB45) are described.

In the renewable energy fluctuation database DB32, the renewable energy fluctuation data D32 is stored in such a manner as depicted in FIG. 5. The renewable energy fluctuation data D32 is information D323 relating to a renewable energy fluctuation for each date and time D321 and each renewable energy ID (D322). Here, the renewable energy fluctuation database DB32 is a data group of a table format created for each date and time D321, and in the example depicted in FIG. 5, data groups at time 0:00 and time 0:30 are exemplified. Besides, an example is depicted in which the information D323 relating to a renewable energy fluctuation in regard to a renewable energy R1 and a renewable energy R2 is retained as a renewable energy R is depicted.

The information D323 relating to a renewable energy fluctuation exemplified in FIG. 5 represents a case in which the axis of ordinate indicates the electric power P of the renewable energy R1 and the axis of abscissa indicates the fluctuation ΔP1 of the renewable energy R1, and in which the fluctuation ΔP1 of the renewable energy R1 is given by a probability density function, and includes information of the average value p and the standard deviation σ. It is to be noted that the information D313 relating to the renewable energy fluctuation may be information relating to an occurrence frequency of each renewable energy fluctuation amount for a month, a week, a year, or the like. Where the information D313 includes such information as just mentioned, the system influence degree can be evaluated for each renewable energy, and a renewable energy fluctuation condition and a control target can be selected.

In the assumed fault database DB33, assumed fault data D33 is stored in such a manner as depicted in FIG. 6. The assumed fault data D33 is configured from data of a fault location D333, a fault mode D334, an occurrence probability D335, and so forth for the assumed fault case ID (D332) for each date and time D331. Here, the assumed fault database DB33 is a data group of a table format created for each date and time D331, and in the example depicted in FIG. 6, data groups at time 0:00 and time 0:30 are exemplified. It is to be noted that the date and time D331 may otherwise be an optional time interval.

Further, the assumed fault case ID (D332) is linked to the assume fault case ID (D912) of the control table calculation result data D91 in the system stabilization system 60. The fault mode D334 includes a combination of a phase, a line number, and a fault mode of a fault line or lines, or the like. Here, 3φ6LG(ABCA'B'C') in FIG. 6 represents a three-phase six-wire ground fault and represents that the A phase, B phase, C phase, A' phase, B' phase, and C' phase suffer from a ground fault. Accordingly, for example, FIG. 6 represents that, in the assumed fault case C1, a three-phase six-wire ground fault occurs with a probability of 40% at a sending end of the power transmission line A1. It is to be noted that the occurrence probability D335 may otherwise be information relating to an occurrence frequency of each assumed fault case for a month, a week, a year, or the like. Where the occurrence information D335 includes such information as just mentioned, the system influence degree can be evaluated for each assumed fault, and a renewable energy fluctuation condition and an assumed fault condition can be selected.

In the system influence degree evaluation result database DB41, system influence degree evaluation result data D41 is stored in such a manner as depicted in FIG. 7. In the system influence degree evaluation result data D41, two kinds of data by rough division are stored. As the data, the system influence degree evaluation result data D41 is obtained from a point of view of the renewable energy and from a point of view of an assumed fault, and the former data is D41A and the latter data is D41B.

The system influence degree evaluation result data D41 obtained from the first point of view of the renewable energy is data of constraint sensitivity D414A for each date and time D411A, for each renewable energy ID (D412A), and for each direction D413A. The direction D413A indicates a fluctuation direction from an average value of a renewable energy fluctuation, and where the output is greater than the average value, the direction is indicated in the positive, but where the output is smaller than the average value, the direction is indicated in the negative. Further, the constraint sensitivity D414A indicates an influence amount on the system constraint in a case where each renewable energy fluctuates by a unit amount (for example, 1 MW) in each direction.

For example, in the case example of the renewable energy R1 of FIG. 7, it is represented that, in a case where the renewable energy R1 fluctuates by the unit amount in the positive direction, this influences by 100 on the system constraint, and that, in a case where the renewable energy R1 fluctuates by the unit amount in the negative direction, this does not influence on the system constraint. On the other hand, in the case example of the renewable energy R2, although, in a case where the renewable energy R2 fluctuates by the unit amount in the positive direction, this does not influence on the system constraint, in a case where the renewable energy R2 fluctuates by the unit amount in the negative direction, this influences by 100 on the system constraint. It is to be noted that the influence amount on the system constraint is a dimensionless quantity because it can become a value in which different dimension quantities are integrated as hereinafter described. In the following, as an example of a calculation method of a system constraint influence amount, a method based on the Lagrange constant in optimization calculation and a method based on tidal current calculation are indicated.

First, the method based on the Lagrange constant in optimization calculation is depicted. In a case where an output state of each generator when a renewable energy output has a certain value (for example, an average value of the renewable energy fluctuation data D32) is to be obtained by optimization calculation, it can be formulated like the expression (1).

[Expression 1]

$$\text{minimize } f(x,\alpha 0) \text{subject to } h(x,\alpha 0)=0 g(x,\alpha 0)\le 0 \qquad (1)$$

Here, $x \in R^n$ is a decision variable, and $\alpha \in R^r$ is a parameter representative of a renewable energy fluctuation and is α0 where the renewable energy fluctuation is an average value. Meanwhile, $f(x): R^n \to R$ represents an objective func- 13
14 tion; h(x): $\mathbb{R}^n \to \mathbb{R}^{m1}$ represents an equality constraint; and g(x): $\mathbb{R}^n \to \mathbb{R}^{m2}$ represents an inequality constraint. The decision variable consists of a magnitude and a phase of a bus line voltage, a generator output, and so forth. Meanwhile, the equality constraint consists of supply and demand constraints, and the inequality constraint consists of system constraints such as voltage upper and lower limit constraints, generator upper and lower output constraints, and a line tidal current constraint.

The first-order necessary condition for x* to be an optimal solution in the optimization problem of the expression (1) is known as KKT condition of the expression (2). Here, $\lambda_i$ and $\mu_i$ are called Lagrange constants.

[Expression 2]

$$\begin{cases} \nabla f(x^*, \alpha 0) \ne \sum_{k=1}^{m_1} \lambda_i \Delta h_i(x^*, \alpha 0) \ne \sum_{k=1}^{m_1} \mu_i \nabla g_i(x^*, \alpha 0) = 0 & (2) \\ h_i(x^*, \alpha 0) = 0 (1 = 1, \dots, m_1) \\ \mu_i \ge 0, g_i(x^*, \alpha 0) \le 0. \ \mu_i g_i(x^*, \alpha 0) = -(i = 1, \dots, m_2) \end{cases}$$

The Lagrange constant is also called shadow price (shadow price) and represents a rate of change of an optimum value of an objective function when the constraint condition changes. For example, it is assumed that the inequality constraint g(x, $\alpha 0$)≤0 changes as represented by the expression (3).

[Expression 3]

$$g_i(x, \alpha 0) \le C_i (C_i \text{ is a constant}) \tag{3}$$

The change in the optimum value of the objective function in this case (partial differential coefficient) is given by the expression (4).

[Expression 4]

$$\frac{\partial f(x^*, \alpha 0)}{\partial C_i} = -\mu_i \tag{4}$$

By using the expression (4), the amount of change in the optimum value of the objective function when the renewable energy changes from the average value $\alpha 0$ can be obtained in the following manner. If it is assumed that, in the ith inequality constraint g(x, $\alpha 0$)≤0, the ith renewable energy changes by a very small amount $\Delta \alpha_j$ (=$aj-\alpha 0j$) from the average value $\alpha 0j$, then the inequality constrained is given by the expression (5).

[Expression 5]

$$g_i(x, \alpha 0) \ne \frac{\partial g_i(x, \alpha 0)}{\partial \alpha_j} \Delta \alpha_j \le 0 \tag{5}$$

By transforming the expression (5), the expression (6) is obtained.

[Expression 6]

$$g_i(x, \alpha 0) \le -\frac{\partial g_i(x, \alpha 0)}{\partial \alpha_j} \Delta \alpha_j \tag{6}$$

Here, the expression (7) is put.

[Expression 7]

$$C_i = -\frac{\partial g_i(x, \alpha 0)}{\partial \alpha_j} \Delta \alpha_j \tag{7}$$

By partially differentiating the expression (7) with aj, the expression (8) is obtained.

[Expression 7]

$$\frac{\partial C_i}{\partial \alpha_j} = -\frac{\partial g_i(x, \alpha 0)}{\partial \alpha_j} \tag{7}$$

From the expression (4) and the expression (8), the expression (9) is obtained by a differential chain rule.

[Expression 9]

$$\frac{\partial f(x^*, \alpha 0)}{\partial \alpha_j} = \frac{\partial f(x^*, \alpha 0)}{\partial C_i} \frac{\partial C_i}{\partial \alpha_j} = \mu_i \frac{\partial g_i(x, \alpha 0)}{\partial \alpha_j} \tag{9}$$

The expression (9) represents by what degree the optimum value of the objective function changes by the change in the ith inequality constraint arising from a fluctuation of the jth renewable energy. This represents that, as the sensitivity of the expression (9) increases, the change in the optimum value of the objective function increases by a great amount in order to satisfy the constraint condition in the event of renewable energy fluctuation, and therefore, it can be considered that the magnitude of the sensitivity represents an influence degree of the constraint condition on the system. Accordingly, the expression (9) becomes the constraint sensitivity corresponding to the jth renewable energy. It is to be noted that a sensitivity obtained by the expression (9) corresponds to the positive in the direction 413A of FIG. 7, and a sensitivity obtained by the expression (9) but inverted between the positive and the negative corresponds to the negative in the direction D413A of FIG. 7. In a case where the constraint sensitivity is in the positive, this signifies that the optimum value of the objective function deteriorates in order to satisfy the inequality constraint in the event of renewable energy fluctuation. Since this is equivalent to that the system state (dispatchable set) that satisfy the system constraint is narrowed by a renewable energy fluctuation, it can be considered that the constraint condition is a condition whose importance degree is high in that it is included as a computation condition of the system stabilization system 60 in order to implement a system state that complies with the system constraint.

As an example of the calculation method of a system constraint influence amount, the method based on the Lagrange constant in optimization calculation has been described. Now, a method based on tidal current calculation that is the other calculation method is described. The tidal equation in a case where the renewable energy fluctuation is an average value is the expression (10).

[Expression 10]

$$h(x, \alpha 0) = 0 \tag{10}$$

Where the decision variable that satisfies the expression (10) when the renewable energy changes by a very small amount $\Delta \alpha_j$ (=$\alpha_j - \alpha 0j$) from the average value $\alpha 0$ is x0, the expression (11) is obtained.

[Expression 11]

$$h(x0, \alpha0 + \Delta\alpha_j) = 0 \tag{11}$$

By substituting this x0 into each inequity constraint, the expression (12) is obtained.

[Expression 12]

$$g(x0, \alpha0 + \Delta\alpha_j) \leq 0 \tag{12}$$

The expression (12) is not necessarily satisfied, and in a case where there exists an inequality constraint that does not satisfy the expression (12), this represents that a corresponding system constraint is deviated. If the square root of the square sum of the deviation amounts of the inequality constraints is $\Delta E$, then the amount of change in the deviation amount of the ith inequality constraint arising from fluctuation of the ith renewable energy is given by the expression (13).

[Expression 13]

$$\frac{\Delta E}{\Delta\alpha_j} \tag{13}$$

The expression (13) represents a sensitivity indicative of by what degree the deviation amount of the ith inequality constraint arising from fluctuation of the jth renewable energy changes. As the sensitivity of the expression (13) increases, the deviation amount of the system constraint in the event of renewable energy fluctuation increases, and therefore, it can be considered that the magnitude of the sensitivity represents an influence degree of the constraint condition on the system. Accordingly, the expression (13) is the constraint sensitivity corresponding to the jth renewable energy. It is to be noted that a sensitivity obtained by the expression (13) corresponds to the positive in the direction D413A of FIG. 7, and a sensitivity obtained by the expression (9) but inverted between the positive and the negative corresponds to the negative in the direction D413A of FIG. 7. In a case where the constraint sensitivity is in the positive, this signifies that the inequality constraint deviates in the event of renewable energy fluctuation, it can be considered that the constraint condition is a condition whose importance degree is high in that it is included as a computation condition of the system stabilization system 60 in order to implement a system state that complies with the system constraint.

Although, as an example of the calculation method of a system constraint influence amount, the method based on the Lagrange constant in optimization calculation and the method based on tidal calculation have been described, since, according to the method based on the Lagrange constant from between the two methods, the Lagrange constants corresponding to all inequality constraints can be obtained by single time optimization calculation and also the partial differentiation of the expression (9) can be calculated easily if each inequality constraint is formulated as a function, the additional calculation load for sensitivity calculation is required less.

On the other hand, although the method based on the tidal calculation requires the tidal calculation of the expression (11) for each renewable energy fluctuation, also in a case where the inequality constraint is not formulated as a function, the constraint deviation amount of the expression (13) can be calculated. For example, in a case where synchronism stability is considered as the system constraint, as a candidate for the constraint sensitivity, such a sensitivity for a maximum value of the generator internal phase angle by a renewable energy fluctuation as represented by the expression (14) seems applicable.

[Expression 14]

$$\frac{\Delta\delta_{max}}{\Delta\alpha_j} \tag{14}$$

Here, $\Delta\delta$max is defined as the difference $\Delta\delta$max$=\Delta\delta$maxafter$-\Delta\delta$maxbefore between a maximum value $\Delta\delta$maxbefore of the generator internal phase angle in a transient calculation result in a case where the renewable energy fluctuation is an average value and a maximum value $\Delta\delta$maxafter of the generator internal phase angle in transient calculation results in a case where the renewable energy fluctuation changes by a very small amount. Here, since it is generally difficult to formulate $\Delta\delta$max as a function of the decision variable x, it is hard to obtain a partial differentiation of the expression (9) or the Lagrange constant in the method that is based on the Lagrange constant.

On the other hand, in the method based on the tidal calculation, since $\Delta\delta$max can be obtained from results of tidal calculation and transient calculation in the case where the renewable energy fluctuation is an average value and in the case where the renewable energy fluctuation changes by a very small amount, also it is possible to obtained the sensitivity of the expression (14). Here, the calculation method of a time series change in the generator internal phase angle can be obtained, for example, in accordance with Akihiko YOKOYAMA and Kouji OHTA, "Power System Stabilization System Engineering", The Institute of Electrical Engineers of Japan, 2014, pp. 54-57 or the like.

The constraint sensitivity can be calculated not only in regard to the generator internal phase angle in synchronization stability but also in regard to various system constraints whose formulation as a function of a decision variable is difficult such as a maximum value or a minimum value of a frequency in frequency stability, a load tolerance to a nose point of a power-voltage characteristic (P-V curve) in voltage stability, a transient voltage, or an overload.

Referring back to FIG. 7, the other data D41B from between the two kinds of data D41A and D41B stored in the system influence degree evaluation result database DB41 is system influence degree evaluation result data D41 obtained from the point of view of assumed faults. The system influence degree evaluation result data D41B obtained from the point of view of assumed faults is data of the system stabilization control amount D413B and so forth for each date and time D411B and each assumed fault case D412B. D41B is a data group of a table format created for each date and time D411B, and in the example depicted, data groups at time 0:00 and time 0:30 are exemplified.

In FIG. 7, the system stabilization control amount D413B is data of a power limit amount D414B and a load limit amount D415B that are required for system stabilization when a corresponding assumed fault occurs. FIG. 7 signifies that, for system stabilization, for example, when an assumed fault whose assumed fault case ID is C1 occurs, the power limit of 500 MW and the load limit of 500 MW are required. Since that the system stabilization control amount is great signifies that the assumed fault requires a high degree of necessity of control by the system stabilization system 60, it is considered that this is a condition having a high importance degree for including it as a computation condition of the system stabilization system 60 in order to implement a system state that complies the system constraint.

By evaluating the system influence degree in such a manner as described above, the influence degree on the system arising from renewable energy fluctuation or occurrence of an assumed fault can be evaluated quantitatively.

In the computation condition selection index calculation result database DB42, computation condition selection index calculation result data D42 is stored in such a manner as depicted in FIG. 8. In the computation condition selection index calculation result data D42, two kinds of data by rough division are stored. The mentioned computation condition selection index calculation result data D42 are obtained from a point of view of renewable energy and a point of view of an assumed fault, and the former data is D42A and the latter data is D42B.

The computation condition selection index calculation result data D42A obtained from the first point of view of renewable energy is data of a constraint sensitivity D424, a standard deviation D425A, a constraint condition selection index D426A, a control target selection index D427A, and so forth for each date and time D421A, each renewable energy ID (D422A), and for each direction D423A. The standard deviation D425A corresponds to the standard deviation σ stored in the renewable energy fluctuation data D31. The constraint condition selection index D426A indicates an importance degree as a constraint condition, and signifies that, as it increases, the importance degree increases.

FIG. 8 represents, for example, that the constraint condition selection index value of the renewable energy R1 in the positive direction is 100 and the constraint condition selection index value in the negative direction is 0. The calculation method of the constraint condition selection index D426A is, for example, same as that of the constraint sensitivity D424A in a corresponding direction of the corresponding renewable energy. This makes it possible to increase the constraint condition selection index of the renewable energy fluctuation whose constraint sensitivity is high. The control target selection index D427A indicates an importance degree as a control target and signifies that, as it increases, the importance degree increases.

FIG. 8 represents, for example, that the control target selection index value of the renewable energy R1 is 0 and the control target selection index value of the renewable energy R2 is −20. The calculation method of the control target selection index D427A is that, for example, an absolute value of the standard deviation is subtracted from a set value. FIG. 8 depicts a case in which the set value is 10 MW. As the standard deviation increases, the deviation with respect to a control instruction in a case where the control target selection index value is selected as a control target increases, and the feasibility of the control instruction decreases. Therefore, this makes it possible to decrease the control target selection index of the renewable energy whose standard deviation is great.

From between the two kinds of data stored in the computation condition selection index calculation result database DB42, the other computation condition selection index calculation result data D42B obtained from the point of view of an assumed fault is data of a system stabilization control amount D423B, an occurrence probability D426B, a constraint condition selection index D427B, and so forth for each date and time D421B and each assumed fault case ID (D422B). The system stabilization control amount D423B is data of a power limit amount D424B, a load limit amount D425B, and so forth that are required for system stabilization when a corresponding assumed fault occurs. The constraint condition selection index D427B indicates a priority degree of each assumed fault case, and represents that, as it increases, the priority rank is high.

FIG. 8 represents, for example, that the constraint condition selection index value of the assumed fault case C1 is 250 and the constraint condition selection index value of the assumed fault case C2 is 150. The calculation method of the constraint condition selection index is, for example, that it is obtained by weighted multiplication of the system stabilization control amount and the occurrence probability. FIG. 8 depicts a case in which both of the weights of the system stabilization control amount and the occurrence probability are 1. Consequently, even if the occurrence probability of an assumed fault is low, in a case where the system stabilization control amount for the assumed fault is great, the constraint condition selection index value is high, and therefore, the priority rank is high. On the other hand, the priority level of an assumed fault for which the system stabilization control amount is small is low even if the occurrence probability is high. This makes it possible to set a high priority rank to an assumed fault of a high importance degree for which the system stability control amount is great even if the assumed fault arises from a rare frequency disaster and is low in occurrence probability.

By calculating the computation condition selection index in such a manner as described above, a renewable energy fluctuation condition having a high influence degree from a point of view of a system constraint, a renewable energy having a high reliability degree from a point of view of the feasibility with respect to a control instruction, and an assumed fault condition having a high influence degree on the system from a point of view of the control amount and the occurrence probability can be evaluated quantitatively.

In the renewable energy fluctuation condition selection result database DB43, renewable energy fluctuation condition selection result data D43 is stored in such a manner as depicted in FIG. 9. The renewable energy fluctuation condition selection result data D43 is data of a constraint condition selection index D434, a constraint condition selection result D435, and so forth for each date and time D431, each renewable energy ID (D432), and for each direction D433.

The constraint condition selection result D435 represents whether or not a corresponding constraint condition is selected, and is 1 in a case where the corresponding renewable energy fluctuation is selected as the renewable energy fluctuation condition, but is 0 in a case where the corresponding renewable energy fluctuation is not selected. For example, FIG. 9 represents that, although the fluctuation of the renewable energy R1 in the positive direction is selected as the renewable energy fluctuation condition, the fluctuation in the negative direction is not selected as the renewable energy fluctuation condition.

The calculation method of the constraint condition selection result D435 is such that, for example, it is 1 in a case where the constraint condition selection index (D434) of the corresponding renewable energy fluctuation is in the positive, but is 0 in a case where the constraint condition selection index D434 is 0 or in the negative. This is because, since that the constraint condition selection index D434 is in the positive signifies that the optimum value or the constraint deviation amount of the objective function value increases by the corresponding renewable energy fluctuation, the influence on the system is great, and this is a condition that is included as the computation condition of the system stabilization system 60 in order to implement a system condition that complies with the system constraint and therefore is high in importance degree.

This makes it possible to select the renewable energy fluctuation having a high importance degree as a computation condition of the system stabilization system 60. Further, the setting method of the renewable energy fluctuation amount in a case where the renewable energy fluctuation is selected is such that, for example, the renewable energy fluctuation amount is set to three times the standard deviation. This makes it possible to set the renewable energy fluctuation amount based on statistical information as a computation condition.

In the assumed fault condition selection result database DB44, the assumed fault condition selection result data D44 is stored in such a manner as depicted in FIG. 10. The assumed fault condition selection result data D44 is data of constraint condition selection index D443, a constraint condition selection result D444, and so forth for each date and time D441 and each fault case ID (D442). The constraint condition selection result D444 indicates a priority rank of each assumed fault case. For example, FIG. 10 represents that the priority rank of the assumed fault case C3 is 1; the priority rank of the assumed fault case C1 is 2; and the priority rank of the assumed fault case C5 is 100.

The calculation method of the constraint condition selection result D444 is such that it is represented by a descending order of the constraint condition selection index D443. This makes it possible to include an assumed fault of a high degree of importance as a computation condition for the system stabilization system 60 even if the assumed fault arises from a rare frequency disaster and therefore is low in occurrence probability.

Further, the system stabilization system 60 preferentially calculates a control table for an assumed fault of a high priority rank. For example, while a control table for an assumed fault of a high priority rank is calculated in a high frequency (in a cycle of 30 seconds or the like), a control table for an assumed fault of a low priority rank is calculated in a low frequency (in a cycle of 5 minutes or the like). This makes it possible for the system stabilization system 60 to calculate a control table for an assumed fault of a high importance degree in a high frequency. Therefore, also for an assumed fault having a high system influence degree like a large-scale disaster, system stabilization control according to a system state that changes from time to time is possible, and the system stability can be maintained.

In the control target selection result database DB45, the control target selection result data D45 is stored in such a manner as depicted in FIG. 11. The control target selection result data D45 is data of control target selection index D453, control target selection result D454, and so forth for each date and time D451 and for each renewable energy ID (D452).

The control target selection index D453 represents whether or not a control target of a corresponding renewable energy is selected, and is 1 in a case where the corresponding renewable energy is selected as a control target, but is 0 in a case where the corresponding renewable energy is not selected. For example, FIG. 11 represents that, although the renewable energy R1 is selected as a control target, the renewable energy R2 is not selected as a control target. The calculation method of the control target selection index D453 is such that, for example, it is 1 in a case where the control target selection index D453 of the corresponding renewable energy is 0 or in the positive, but it is 0 in a case where the control target selection index D453 is in the negative.

That the control target selection index D453 is 0 or in the positive signifies that the standard deviation of the corresponding renewable energy is greater than a set value. Since, as the standard deviation increases, the feasibility with respect a control instruction in a case where the renewable energy is selected as a control target is low, a renewable energy that is small in standard deviation and is high in feasibility of a control instruction is selected as a control target, and a renewable energy that is great in standard deviation and is low in feasibility of a control instruction is excluded from a control target. This makes it possible to exclude a control target that is low in feasibility of a control instruction from a computation condition of the system stabilization system 60.

Now, an example of contents of processing of the power system supervisory control apparatus 10 is described with reference to FIG. 13. FIG. 13 is an example of a flow chart depicting overall processes of the power system supervisory control apparatus 10.

In processing step S100 of FIG. 13, the power system supervisory control apparatus 10 uses the system data D31, renewable energy fluctuation data D32, and assumed fault data D33 to evaluate an influence degree with which each renewable energy fluctuation and each assumed fault have an influence on the system, and outputs resulting system influence degree evaluation result data D41.

In processing step 200, the power system supervisory control apparatus 10 uses the system influence degree evaluation result data D41 to calculate an index for selecting each renewable energy fluctuation and each assumed fault as computation conditions for the system stabilization system 60 and outputs resulting computation condition selection index calculation result data D42.

In processing step S300, the power system supervisory control apparatus 10 uses the computation condition selection index calculation result data D42 to select a renewable energy fluctuation to be set as a computation condition for the system stabilization system 60 and outputs resulting renewable energy fluctuation condition selection result data D43.

In processing step S400, the power system supervisory control apparatus 10 uses the computation condition selection index calculation result data D42 to select an assumed fault to be set as a computation condition for the system stabilization system 60 and outputs assumed fault condition selection result data D44.

In processing step S500, the power system supervisory control apparatus 10 uses the computation condition selection index calculation result data D42 to select a renewable energy to be made a control target to be set as a computation condition for the system stabilization system 60 and outputs control target selection result data D45.

In processing step S600, the power system supervisory control apparatus 10 transmits the renewable energy fluctuation condition selection index calculation result data D43, assumed fault condition selection result data D44 and control target selection result data D45 as computation conditions for the system stabilization system 60.

By the processes described above, a renewable energy and an assumed fault having a significant influence on the system as computation conditions for the system stabilization system 60 on the basis of renewable energy fluctuation data and assumed fault data, and therefore, the system stability can be maintained even when a renewable energy fluctuation or a rare frequency large-scale disaster occurs.

It is to be noted that, although the foregoing description of the present embodiment is given taking the system stabilization system 60 as an example of a transmission destination of a computation condition selection result, similar advantageous effects to those described above can be achieved also in a case where the transmission destination is a central load-dispatching instruction system, a core load-dispatching instruction system, a system load-dispatching instruction system, a market management system or the like.

Figure 14:
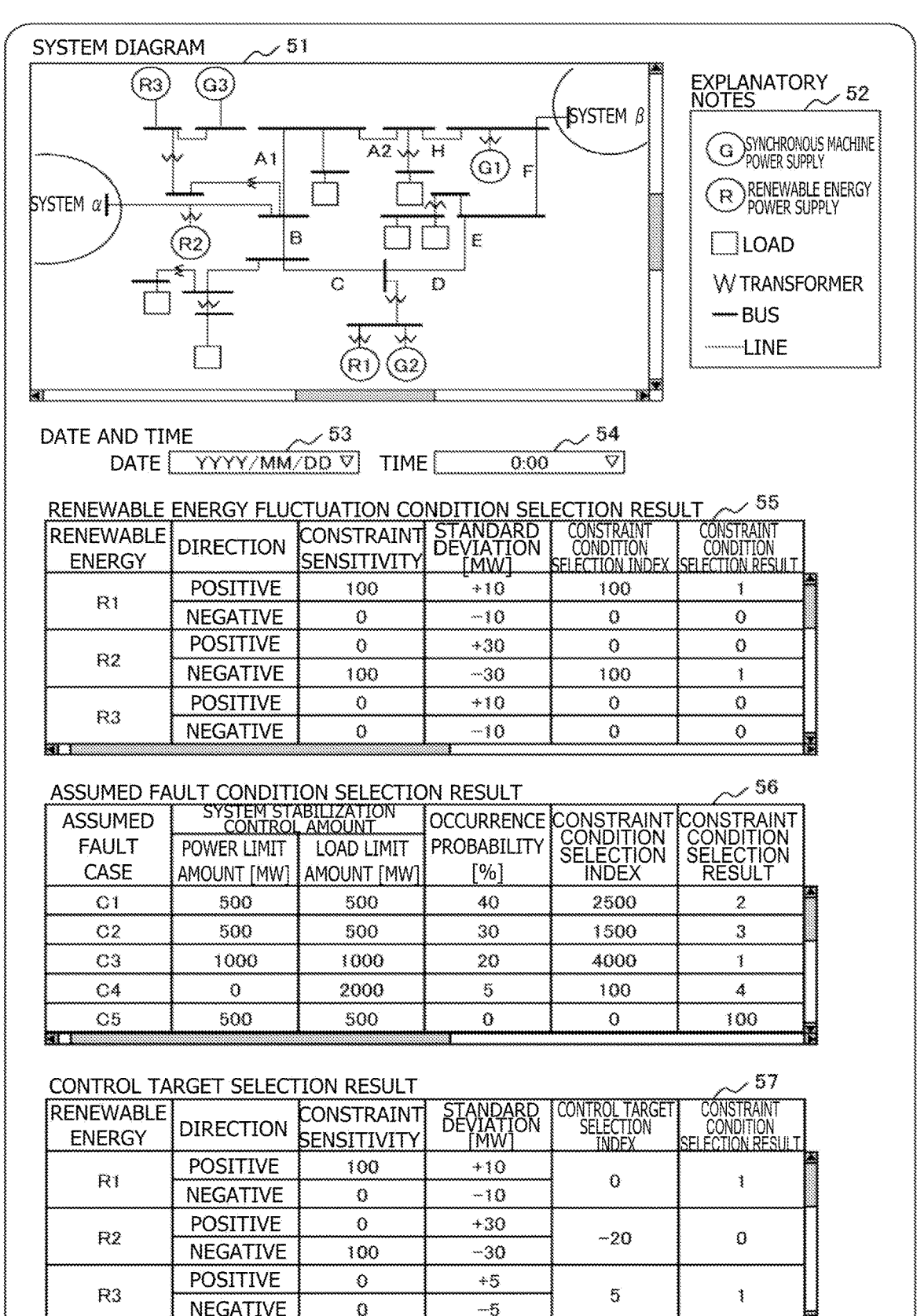
FIG. 14 is a view depicting an example of a screen display image of the power system supervisory control apparatus according to the embodiment 1.

Here, an example of particular display contents is described with reference to FIG. 14. In FIG. 14, a date 53, time 54, renewable energy fluctuation condition selection result data 55, assumed fault condition selection result data 56, and control target selection result data 57 are displayed. These display data items mentioned can be selected freely by a user. Further, since also a system diagram 51 and an explanatory note 52 are additionally displayed in the display of FIG. 13, the display form makes a user easily understand a renewable energy or a position of an assumed fault selected as a computation condition. Further, there is an advantageous effect that the correspondence among the selected renewable energy function condition, assumed fault condition, and control target can be recognized at a glance.

FIG. 15 depicts another example of the display contents. In FIG. 15, a date 53, time 54, renewable energy data 58, and assumed fault data 59 are displayed. These display data items mentioned can be selected freely by a user. Further, also a system diagram 51 and an explanatory note 52 are additionally displayed in the display of FIG. 15. In the system diagram 51, a color is applied according to an occurrence probability of an assumed fault, and it is indicated that, as the color density increases, the occurrence probability increases. Further, in the system diagram 51, a broken line is applied according to the uncertainty of the renewable energy, and it is indicated that, as the standard deviation of the renewable energy increases, the radius of the broken line circle increases. This display provides an advantageous effect that a user can easily recognize the renewable energy fluctuation and the statistical information regarding the assumed fault together with the position of the assumed fault.

DESCRIPTION OF REFERENCE SYMBOLS

10: Power system supervisory control apparatus
101: CPU of power system supervisory control apparatus
102: Memory of power system supervisory control apparatus
103: Inputting section of power system supervisory control apparatus
104: Communication section of power system supervisory control apparatus
105: Display section of power system supervisory control apparatus
91: Bus line of power system supervisory control apparatus
300: Communication network
20: Computation condition selection section
21: System influence degree evaluation section
22: Computation condition selection index calculation section
23: Renewable energy fluctuation condition selection section
24: Assumed fault condition selection section
25: Control target selection section
26: Computation condition transmission section
50: Display section
60: System stabilization system
71: Control table calculation section

D20: Computation condition selection program data
DB20: Computation condition selection program database
D30: Computation condition selection input data
DB30: Computation condition selection input database
D31: System data
DB31: System database
D32: Renewable energy fluctuation data
DB32: Renewable energy fluctuation database
D33: Assumed fault data
DB33: Assumed fault condition database
D40: Computation condition selection result data
DB40: Computation condition selection result database
D41: System influence degree evaluation result data
DB41: System influence degree evaluation result database
D42: Computation condition selection index calculation result data
DB42: Computation condition selection index calculation result database
D43: Renewable energy fluctuation condition selection result data
DB43: Renewable energy fluctuation condition selection result database
D44: Assumed fault condition selection result data
DB44: Assumed fault condition selection result database
D45: Control target selection result data
DB45: Control target selection result database
D81: Computation condition data
DB81: Computation condition database
D91: Control table calculation result data
DB91: Control table calculation result database
P21: System influence degree evaluation program
P22: Computation condition selection index calculation program
P23: Renewable energy fluctuation condition selection program
P24: Assumed fault condition selection program
P25: Control target selection program
P26: Computation condition transmission program
P50: Display program

The invention claimed is:

1. A power system supervisory control apparatus for supervising and controlling a power system including a plurality of renewable energy power supplies, the power system supervisory control apparatus comprising:

a system influence degree evaluator that evaluates a system influence degree when a renewable energy fluctuation or an assumed fault has an influence on the power system by using, as computation conditions, system data that is data for obtaining a state of the power system, renewable energy fluctuation data indicative of a fluctuation of a power generation output for each of the renewable energy power supplies, and assumed fault data that is data of an assumed fault in the power system, and calculates system influence degree evaluation result data; a computation condition selection index calculator that calculates a selection index for the computation conditions by using the system influence degree evaluation result data to calculate computation condition selection index calculation result data; and a condition selector that selects the computation conditions, the condition selector including one or more of a renewable energy fluctuation condition selector that selects a renewable energy fluctuation condition in the computation conditions by using the computation condition selection index calculation result data, an assumed fault condition selector that selects an assumed fault condition in the computation conditions, and a control target condition selector that selects a control target indicated by the assumed fault data in the computation conditions.

2. The power system supervisory control apparatus according to claim 1, comprising:

a computation condition transmitter that transmits one or more of selection result data of the renewable energy fluctuation condition selector, selection result data of the assumed fault condition selector, and selection result data of the control target condition selector to one or more of a system stabilization system, a central load-dispatching instruction system, a core load-dispatching instruction system, a system load-dispatching instruction system, and a market management system.

3. The power system supervisory control apparatus according to claim 1, wherein the renewable energy fluctuation data includes a fluctuation probability or a fluctuation frequency for each of the renewable energy power supplies.

4. The power system supervisory control apparatus according to claim 1, wherein the assumed fault data includes a generation probability or a generation frequency for each assumed fault.

5. The power system supervisory control apparatus according to claim 1, wherein the system influence degree evaluation result data includes one or more of a constraint sensitivity representative of an influence degree of each renewable energy fluctuation on a system constraint and a system stabilization control amount necessary for system stabilization maintenance when each assumed fault occurs.

6. The power system supervisory control apparatus according to claim 5, wherein the computation condition selection index calculation result data includes one or more of a constraint condition selection index representative of an importance degree of each renewable energy fluctuation, a control target selection index representative of an importance degree of each renewable energy as a control target, and a constraint condition selection index representative of a priority degree of each assumed fault.

7. The power system supervisory control apparatus according to claim 6, wherein the selection result data of the renewable energy fluctuation condition includes a constraint condition selection result representative of whether or not each renewable energy fluctuation is selected as a computation condition.

8. The power system supervisory control apparatus according to claim 6, wherein the selection result data of the assumed fault condition includes a constraint condition selection result representative of a priority rank as the computation condition for each assumed fault.

9. The power system supervisory control apparatus according to claim 6, wherein the selection result data of the control target includes a control target selection result representative of whether or not each renewable energy is selected as the control target in the computation conditions.

10. The power system supervisory control apparatus according to claim 1, wherein the power system supervisory control apparatus displays statistical information of a renewable energy fluctuation and a probability of an assumed fault on a system diagram by using system data, renewable energy fluctuation data, and assumed fault data.

11. A power system supervisory controlling system, comprising:

the power system supervisory control apparatus according to claim 1; and a system stabilization system including a control table calculation section that retains a computation condition obtained by the condition selector of the power system supervisory control apparatus and creates a control table when an assumed fault occurs.

12. A power system supervisory control method for supervising and controlling a power system including a plurality of renewable energy power supplies, the power system supervisory control method comprising:

evaluating a system influence degree when a renewable energy fluctuation or an assumed fault has an influence on the power system by using, as computation conditions, system data that is data for obtaining a state of the power system, renewable energy fluctuation data indicative of a fluctuation of a power generation output for each of the renewable energy power supplies, and assumed fault data that is data of an assumed fault in the power system; calculating a selection index for the computation conditions by using a result of the evaluation of the system influence degree; and selecting the computation conditions, the selecting the computation conditions including execution of one or more of selection of a renewable energy fluctuation condition in the computation conditions by using the calculated selection index in the computation conditions, selection of an assumed fault condition in the computation conditions, and selection of a control target in the computation conditions.

13. The power system supervisory control method according to claim 12, wherein the renewable energy fluctuation data includes information of a fluctuation probability or a fluctuation frequency for each of the renewable energy power supplies.

14. The power system supervisory control method according to claim 12, wherein the assumed fault data includes information of a generation probability or a generation frequency for each assumed fault.

15. The power system supervisory control method according to claim 12, wherein a result of the evaluation of the system influence degree includes information of one or more of a constraint sensitivity representative of an influence degree of each renewable energy fluctuation on a system constraint and a system stabilization control amount necessary for system stabilization maintenance when each assumed fault occurs.

* * * * *